ns" 2,832,758
Patented Apr. 29, 1958

2,832,758
SOLID PREPOLYMERS OF DIALLYL PHTHALATE

Charles A. Heiberger and James L. Thomas, Nitro, W. Va., assignors to Food Machinery and Chemical Corporation, New York, N. Y., a corporation of Delaware No Drawing. Application February 19, 1954
Serial No. 411,576

5 Claims. (Cl. 260—78.4)

This invention relates to preparation of diallyl phthalate polymers, and particularly to a novel prepolymer and a novel method for the preparation thereof.

It is generally known that the polymerization of diallyl phthalate normally proceeds in an unsatisfactory manner, resulting in the formation of an insoluble gel after only a relatively small amount of the initial monomer has been converted to a polymeric form. The polymer obtained consists of a minor proportion of insoluble, infusible polymer suspended in unreacted monomer and soluble polymerized material. Its solubility and nonuniformity make it commercially undesirable. When it is used as a molding material, excessive shrinkage is encountered and the resulting castings frequently are characterized by strain patterns and structural weaknesses.

One previously attempted solution of this problem has been to conduct the polymerization of diallyl phthalate (DAP) in two stages. The DAP monomer is polymerized under carefully controlled conditions to a limited extent, to avoid the hazard of sudden gelation; and the resulting mixture is then treated to remove the unreacted monomer and obtain a slightly polymerized product of desirable physical and chemical properties. This product may conveniently be termed a diallyl phthalate "prepolymer," and this term and the abbreviation "DAPP" is used hereinafter to designate the product obtained by the first stage of this two stage process. The second stage involves the use of this prepolymer in the various conventional, commercial operations to produce the finished polymeric, plastic product desired, such as by casting or molding. This two stage process is generally recognized as yielding superior plastics.

The major difficulty involved in this two stage process is that of successfully effecting the first step of the process, i. e. the preparation of a prepolymer of suitable properties. One difficulty involved in preparing a prepolymer is to discontinue the polymerization prior to undesirable gelation. The prepolymer should also be soluble, fusible, and characterized by a minimum of crosslinkage. The most desirable result would be to have the prepolymer as a solid, preferably in the form of a free-flowing powder or granular material. The only commercial preparations available are sold as a solution or mixture of the prepolymer in the monomer, or as a solution of prepolymer in acetone. This limits the commercial utility of the diallyl prepolymers.

It is an object of the present invention to avoid the foregoing and other prior art disadvantages in the preparation of diallyl phthalate polymers.

A principal object of this invention is to provide a method of preparing diallyl phthalate prepolymers in a desirable solid form.

Another object of this invention is to provide a novel type of diallyl phthalate prepolymer.

Other objects will be obvious to those skilled in the art from a consideration of the disclosures herein.

It has been discovered that the foregoing and other objects are accomplished by heating a diallyl phthalate in an aqueous medium comprising the monomer, a chain-length regulator or polymerization modifier, a catalyst and water, after which the prepolymer is separated from the other end products of the reaction. In some cases, improved results are obtained by also adding a small proportion of a dispersing agent. The entire process must be effected under prescribed and carefully controlled conditions.

The process will be better understood by consideration of the following illustrative examples:

EXAMPLE 1

*With dispersing agent*

A reaction vessel was provided with a high speed agitator, an oil bath heating means and a reflux condenser. 600 parts of water containing 2 parts of animal glue were introduced into the reactor, and 35 parts of dimethyl benzyl alcohol added. The mixture was heated to 80° C., and 165 parts of diallyl phthalate containing 10 parts of benzoyl peroxide were added through a dropping funnel, while maintaining the suspension under vigorous agitation.

After 21 hours at this temperature with continued vigorous agitation, the mixture was cooled to 30° C. and the agitation then discontinued. The mixture was allowed to stand until two definite layers had formed, a lower organic layer, and an upper aqueous layer. The lower layer was separated and added to three volumes of methanol in a vessel which was equipped with an agitator driven by a shaft entering through the bottom of the vessel. Vigorous agitation was maintained throughout the addition of the monomer-polymer mixture, and continued until complete contact had been obtained with the methanol. The prepolymer precipitates as a solid at this point. The liquid was drained off and set aside for reuse.

An additional quantity of methanol was added to the prepolymer and the mixture again agitated. The entire mixture was then filtered, yielding 76 parts of a powdered, solid prepolymer of excellent physical and chemical properties, as follows: Saponification No. 428, iodine No. 58, viscosity 0.82 centipoise (5% solution in benzene), and containing about 94% diallyl phthalate in prepolymer form. The yield based on theory was 43.3%, and based on the monomer consumed was 100%. The prepolymer gave a clear solution in acetone.

This prepolymer showed excellent thermoplastic behavior when molded at 85° C. and 5000 p. s. i. for 10 minutes. Repeated cooling and reheating caused a gradual increase in the initial fusion point of 85° C. to 105° C. after three cycles. The prepolymer gave a fast gel time, and a substantially lower shrinkage in molding tests, in comparison with the monomer.

EXAMPLE 2

*Without dispersing agent*

661 grams of distilled diallyl phthalate, 100 grams of dimethylbenzyl alcohol, 39 grams of water and 13.2 grams of benzoyl peroxide were charged to a reaction flask with agitator. The mixture was heated to the reflux temperature of 100–102° C. After seven hours the batch was cooled, and the organic layer had a dope viscosity of 246 centipoises at 25° C.

175 gram aliquot was precipitated with 800 ml. of isopropanol in 2 successive treatments (400 ml. each). The solid prepolymer was separated by filtration and dried to obtain 49.8 grams (32.6% conversion of monomer to prepolymer).

Orthophthalates are preferred monomeric materials for practice of the instant invention, but iso- and terephthalates may be employed.

The polymerization modifier or chain-length regulator may be any compound of the type:

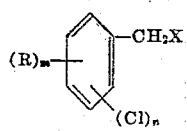

where X=Cl or OH; R=methyl, ethyl and/or propyl; $m$=0–4, but total C of R substituents is less than 5; and $n$=0 to (4−$m$). The compounds containing halogen in the —CH$_2$X group appear to be hydrolyzed to the hydroxyl compounds, so either type may be added initially, as well as mixtures of the two types.

The ratio of modifier to monomer is dependent on the interrelated variables of type and concentration of catalyst, temperature, proportion of water used, and the degree of dispersion of the non-aqueous phase, but in general about 10–25% by weight of modifier, based on the monomer, gives best results. Less beneficial results are obtained as the extremes of the operative range of 1–50% are approached.

In the case of dimethyl benzyl chloride, the optimum ratio of monomer to modifier was found under one set of conditions to be about 3.5:1, although less desirable but satisfactory results can be obtained at other ratios. In the case of dimethyl benzyl alcohol, a preferred modifier, the optimum ratio of monomer to modifier was found to be about 4:1, although here again less favorable but satisfactory results are obtained with ratios varying somewhat from the optimum.

The proportion of water used may vary widely, ranging from a few percent to six times the weight of the monomer used, but the preferred range is normally about 5–60%.

Any of the usual organic peroxide or hydroperoxide catalysts appear to be suitable, such as benzoyl peroxide, tertiary butyl perbenzoate, acetyl benzoyl peroxide and succinyl peroxide. Benzoyl peroxide is preferred. The proportion of catalyst used varies with the reaction conditions, and may range from about 0.1–10.0%, but usually it is not necessary to use more than about 5%, based on the weight of the monomer used. Less catalyst appears to be necessary if it is added portionwise during the reaction, and if the reaction is conducted at higher temperatures. The stability of the particular catalyst is also a determining factor.

The use of a dispersing agent is helpful in promoting the formation of a dispersion, wherein the various components of the mixture may be more intimately contacted with each other. Animal glue and clay have been found to be satisfactory, but other dispersing agents may be employed. It is desirable to promote intimate contact, and this requires the use of efficient and vigorous agitation. This requirement should be kept in mind in selecting the type of reactor and agitating device used. Efficient agitation is also very desirable in the precipitation step, where the solid prepolymer is separated from the unreacted monomer.

These mixtures are normally neutral or slightly acid, and should be so, since it was found that the polymerization reaction is retarded in alkaline media.

The prepolymerization reaction may be conducted at any elevated temperature which will give a reasonably satisfactory rate of formation of the prepolymer, but in general should be within the range of about 70° C. up to reflux temperature of the mixture (about 105° C.). The optimum temperature is a function of the type and concentration of the catalyst used and the particular monomer and modifier selected, but is usually about 100–102° C. Thus, tertiary butyl perbenzoate catalyst appears to function better at a higher temperature than does benzoyl peroxide. By the use of pressure, temperatures above 105° C. may be obtained, giving a shorter reaction time, but the stability of the catalyst under these conditions must be taken into consideration.

The time required for heating the monomer reaction mixture is dependent upon other factors, such as temperature, the type and concentration of catalyst and the ratio of monomer to modifier. The efficiency of agitation is also an important factor in determining the time required for formation of the prepolymer in suitable yields. The reaction time may vary from about 1 to about 25 hours, depending upon other factors, but less than 8 hours is adequate in most cases.

The following tables illustrate the effect of altering such variables as time, temperature, catalyst, regulator, and concentrations of the reactants.

TABLE 1.—TEMPERATURE, TIME, CONCENTRATION OF CATALYST AND REGULATOR VARIABLES

Constants:
1. Weight ratio of H$_2$O to DAP monomer plus dimethylbenzyl alcohol=3:1.
2. Catalyst=benzoyl peroxide (Bz$_2$O$_2$).

| Concentration of Catalyst | Concentration of DMBA[1] | Temp., °C., of Reaction | Time of Reaction (hrs.) | Percent Conversion |
|---|---|---|---|---|
| 1.0 | 25.0 | 79–81 | 7.0 | 0.0. |
| 1.0 | 15.0 | 79–81 | 14.0 | 3.3. |
| 1.0 | 25.0 | 100–102 | 14.0 | 7.9. |
| 1.0 | 15.0 | 100–102 | 7.0 | 20.0. |
| 1.0 | 15.0 | 100–102 | 14.0 | 18.7. |
| 5.0 | 15.0 | 79–81 | | Gelled between 4–7 hours. |
| 5.0 | 15.0 | 100–102 | | Gelled in 35 min. |
| 5.0 | 25.0 | 79–81 | 14.0 | 31.7. |
| 5.0 | 25.0 | 100–102 | 7.0 | 40.5. |

[1] Dimethylbenzyl alcohol.

The above data show that the concentration of regulator is determined by the temperature and catalyst concentration. The time variable becomes of lesser importance if the reactions are run until the catalyst decomposes beyond its effective strength and sufficient regulator is present. Presumably these polymerizations would run for much longer periods without a further increase in yield or gelling if the proper ratio of monomer and catalyst to regulator has previously be established. The data above show that 7 hours at 100–102° C. is approximately the optimum time for benzoyl peroxide in this system.

TABLE 2.—TYPE AROMATIC ALCOHOL OR CHLORIDE (REGULATOR) VARIABLE

[Catalyst=benzoyl peroxide.]

| | Type System[1] | | | | | | |
|---|---|---|---|---|---|---|---|
| | DMBC | DMBA | MBA | IPBA | OCBA | PCBA | BA |
| Percent Regulator[2] | 33.3 | 25.0 | 25.0 | 25.0 | 43.7 | 43.7 | 30.0 |
| Percent Catalyst[2] | 6.6 | 5.0 | 5.0 | 5.0 | 5.0 | 5.0 | 5.0 |
| H$_2$O/reactants | 3:1 | 3:1 | 3:1 | 3:1 | 2.6:1 | 2.6:1 | 2.9:1 |
| Reaction Temp., °C. | 80 | 100 | 100 | 100 | 100 | 100 | 100 |
| Time (hours) | 21 | 7 | 7 | 7 | 7 | 7 | 7 |
| Percent Conversion | 53.5 | 40.5 | 46.3 | 37.8 | 37.0 | 32.0 | 37.8 |

[1] DMBC=dimethylbenzyl chloride; DMBA=dimethylbenzyl alcohol; MBA=methylbenzyl alcohol; IPBA=isopropylbenzyl alcohol; OCBA=ortho-chlorobenzyl alcohol; PCBA=para-chlorobenzyl alcohol; BA=benzyl alcohol.
[2] Weight percent, based on DAP monomer.

The DMBC was hydrolyzed to the alcohol in this system as evidenced by the stripped, recovered monomer having an acetyl number and the water layer containing hydrochloric acid.

TABLE 3.—TYPE CATALYST VARIABLE

|  | Type System [1] | | | |
| --- | --- | --- | --- | --- |
|  | DMBA–TBP | DMBA–Bz₂O₂ | DMBA–TBP | DMBA–Bz₂O₂ |
| H₂O/reactants | 3:1 | 3:1 | 3:1 | 3:1 |
| Percent Regulator (DMBA)[2] | 23.4 | 23.4 | 15.0 | 15.0 |
| Percent Catalyst [2] | 6.2 | 6.2 | 1.0 | 1.0 |
| Reaction Temp., ° C | 80 | 80 | 100 | 100 |
| Time (hours) | 24 | 24 | 7 | 7 |
| Percent Conversion | 0 | 42.1 | 18.7 | 20.0 |

[1] TBP=tertiary butyl perbenzoate.
[2] Weight percent, based on DAP monomer.

The above data show that tert-butyl perbenzoate is almost as effective as benzoyl peroxide at 100° C. but is incapable of initiating polymerization at 80° C.

TABLE 4.—REACTANTS TO WATER RATIO VARIABLE

Constants:
1. Catalyst concentration=2.0% benzoyl peroxide on weight of DAP monomer
2. Regulator=15.0% DMBA on weight of DAP monomer
3. Temperature=100 to 103° C.
4. Time=7 hours

| Ratio of H₂O to DAP monomer plus DMBA | Percent H₂O based on weight of monomer | Percent Conversion |
| --- | --- | --- |
| 0.5:1 | 57.6 | 33.4 |
| 0.25:1 | 28.8 | 32.1 |
| 0.125:1 | 14.4 | 31.5 |
| 0.068:1 | 7.85 | 31.2 |
| 0.050:1 | 5.90 | 32.1 |
| 0.025:1 | 2.94 | 27.4 |
| 0:1 | 0.0 | 19.4 |
| 0:1 | 0.0 | 20.7 |

As indicated above, the addition of the catalyst portionwise has been investigated. The results obtained show that greater efficiency can be obtained by this method than by charging all of the catalyst at the start.

TABLE 5.—COMPARISON OF ADDING CATALYST PORTIONWISE WITH CHARGING THE TOTAL AMOUNT AT THE START

Constants:
(1) Catalyst=1% benzoyl peroxide
(2) Regulator=15% DMBA on weight of DAP monomer
(3) Temperature=100–102° C.
(4) Time=7 hours

| Ratio of H₂O to DMBA plus monomer | Catalyst Added | Percent Conversion |
| --- | --- | --- |
| 0.5:1 | All at the start | 18.5 |
| 0.125:1 | Portionwise [1] | 24.3 |

[1] One-third of the peroxide was added at room temperature and then heated to 100–102° C. One-third more added after two hours at 100–102° C. and the last one-third added after four hours at 100–102° C.

TABLE 6.—GEL TIME DATA

[Data on gel times for diallyl phthalate at 100° C. with 1% benzoyl peroxide by weight. The equipment is a standard General Electric gel time tester. The results follow.]

| Modifier [1] | Gel Time, min. |
| --- | --- |
| Group A: | |
| None | 42 |
| Amyl Chloride | 45 |
| n-Butyl Alcohol | 45 |
| Chlorobenzene | 44 |
| Dichlorobenzene | 44 |
| Xylene | 45 |
| Ethyl Benzene | 47 |
| Diethyl Benzene | 47 |
| Group B: | |
| Benzyl Alcohol | 54 |
| Methyl Benzyl Alcohol | 55 |
| Dimethyl Benzyl Alcohol | 57 |
| Isopropyl Benzyl Alcohol | 59 |
| o-Chlorbenzyl Alcohol | 58 |
| p-Chlorbenzyl Alcohol | 58 |

[1] Moles of modifier per mole of diallyl phthalate was constant at 0.045.

The modifiers of this invention as shown in group B extend the gel time, i. e. allow higher conversions without gelation. The modifiers in group A show little effect in comparison to group B although they have certain structural similarities.

Following the prepolymerization reaction, and isolation of the lower organic layer containing the mixture of monomer and prepolymer, the separation of these two materials may be effected by mixing with a precipitation agent in which the prepolymer is insoluble, such as methanol, ethanol, propanol, isopropanol and butanol. At high precipitant-polymer ratios, a solid prepolymer may be isolated in one step, but at lower ratios two or more precipitations may be required. It is essential that vigorous agitation be used in this precipitation process, as by the use of a mechanical agitator driven at high speed by a shaft entering through the bottom of the vessel. Alternatively, a colloid mill or a ball mill may be employed to give intimate mixing with the precipitation agent.

DAPP is soluble in acetone, benzene, toluene, dimethylbenzyl alcohol, and diallyl phthalate, and insoluble in aliphatic hydrocarbons, methanol, and lower aliphatic alcohols. DAPP can be molded at moderate temperatures and pressures to an acetone-soluble plastic or to a thermoset resin, depending on the time-temperature cycle. It can be fused between glass plates to a strong adherent coating. Thermoplasticity can be maintained, if suitably inhibited. Molded DAPP when completely cured is an insoluble, infusible resin with excellent dielectric properties, especially at high frequencies. A wide range of physical properties is possible depending on the presence or absence of various fillers, e. g. chopped fibers, magnesium oxide, wood flour, etc.

TABLE 7.—TYPICAL PROPERTIES OF DAPP

Sp. gr. at 25° C _____ 1.23–4
Softening range, ° C _____ 80–105
Iodine No _____ 55
Saponification No _____ 435
Residual peroxide (percent as benzoyl peroxide) _ <0.1

Viscosity, cp. at 25° C.:
   25% in diallyl phthalate _____ 615
   50% in acetone _____ 217
   45% in acetone _____ 80
   40% in acetone _____ 31

|  | G. E. gel time, Min. at 100° C. | Percent Shrinkage |
| --- | --- | --- |
| Diallyl phthalate | 41.7 | 10.8 |
| 25 DAPP/75 DAP | 12.3 | 8.3 |

The unfilled thermoset resin has the following typical properties:

R. I. at 25° C _____ 1.571.
Izod impact strength (ASTM D–256–47T) _____ 0.23 ft. lbs./in. of notch.
Ult. flexural strength (ASTM D–790–49T) _____ 5000 p. s. i.
Rockwell hardness (ASTM D–785–51 method A) _____ 116 (M scale).

While we do not wish to be limited or bound by any theory of the mechanism of this reaction, it appears that the modifier acts to control the length of the chain of the polymer formed. If this is so, the monomer molecules combine to form chain polymers of only a few units before the ends of the chain are blocked by combination with molecules of the modifier. Under proper conditions of temperature, catalyst type and concentration, and ratio of monomer to modifier, excessive cross-linkage does not occur and a prepolymer is obtained without gelation, which can be recovered as a powdered or granular material of desirable properties. Experiments have shown that the prepolymerization cannot be controlled to produce a satisfactory product in the absence of a modifier.

The yields of prepolymer obtained are substantially above those resulting from prior art processes, but efforts to further increase the yields above the upper limits obtained herein tend to produce cross-linking in the prepolymer, as evidenced by slight haziness in an acetone solution of the prepolymer. Excessive localized overheating of the reaction vessel likewise tends to produce this effect, and may be avoided by the use of indirect heating in place of conventional direct heating appliances.

Objectionable cross-linking may also result by the use of excessively high ratios of diallyl phthalate to modifier, while an excessively low ratio gives inadequate conversion of monomer to prepolymer. Conversion is aided, other conditions being equal, by efficient contact between the components of the mixture, and this is promoted by the use of a dispersing agent and efficient agitation.

By means of this invention, under optimum conditions, up to about 50% of the monomer may be converted to the prepolymer, after which the balance of the monomer may be recycled for use in the next reaction mixture. The unused modifier may also be recycled for reuse.

A direct relationship exists between the reactivity of the monomer, the amount of free radicals present at a given time and the concentration of the modifier or the chain-length regulator. High catalyst concentration, at a temperature where free radicals are formed rapidly, gives a polymer of low molecular weight. Chain growth is discontinued more rapidly in the presence of excessive proportions of modifier, and may prevent sufficient conversion of monomer to prepolymer. It is desirable to have a catalyst concentration high enough to promote adequte free radical formation, but a proper balance of monomer to modifier must be provided. The modifier serves not only to control the chain length, but also acts as a solvent for the prepolymer, thus keeping the viscosity at a level where a good suspension can be maintained.

From a considertion of the foregoing disclosure, it will be obvious to those skilled in the art that minor deviations can be made without departing from the spirit of this invention, and it is intended that all such deviations fall within the scope of the appended claims.

That which is claimed as new is:

1. The method of preparing a solid diallyl phthalate prepolymer from diallyl phthalate monomer, comprising: polymerizing at elevated temperature a mixture containing diallyl phthalate monomer, water, a peroxide catalyst, and a polymerization modifier of the formula:

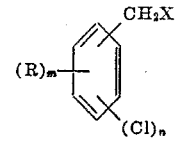

where X is a radical selected from the class consisting of chlorine and hydroxyl radicals; R is a radical selected from the class consisting of methyl, ethyl and propyl radicals; $m=0$ to 4; the total number of carbon atoms in the R radicals is less than 5; and $n=0$ to $(4-m)$; said modifier comprising 1-50% by weight based on the monomer; discontinuing by lowering the temperature below the polymerization temperature the polymerization before substantial gelation occurs; separating unreacted monomer from the prepolymer formed; and recovering the solid prepolymer.

2. The process of claim 1, wherein the percentage weight of modifier based on monomer weight is within the range of 10-25%.

3. The process of claim 1, wherein the catalyst is benzoyl peroxide.

4. The process of claim 1, wherein the modifier is dimethyl benzyl alcohol.

5. The process of claim 1, wherein the catalyst is benzoyl peroxide and the modifier is dimethyl benzyl alcohol.

References Cited in the file of this patent

UNITED STATES PATENTS

| | | |
|---|---|---|
| 2,273,891 | Pollack et al. | Feb. 14, 1924 |
| 2,473,801 | Kropa | June 21, 1949 |
| 2,613,201 | Anderson et al. | Oct. 7, 1952 |